(12) United States Patent
Beals (10) Patent No.: US 11,969,783 B2
(45) Date of Patent: Apr. 30, 2024

(54) METHOD FOR IMPROVING HIGH-PRESSURE DIE CASTING SHOT SLEEVE BY ADDITIVE MANUFACTURING METAL MATRIX COMPOSITE INSERT

(71) Applicant: MAGNA INTERNATIONAL INC., Aurora (CA)

(72) Inventor: Randy S. Beals, Grand Ledge, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 766 days.

(21) Appl. No.: 17/054,274

(22) PCT Filed: May 10, 2019

(86) PCT No.: PCT/US2019/031667
§ 371 (c)(1),
(2) Date: Nov. 10, 2020

(87) PCT Pub. No.: WO2019/217781
PCT Pub. Date: Nov. 14, 2019

(65) Prior Publication Data
US 2021/0245240 A1    Aug. 12, 2021

Related U.S. Application Data (60) Provisional application No. 62/670,064, filed on May 11, 2018.

(51) Int. Cl.
*B22D 17/20* (2006.01)
*B22F 5/10* (2006.01)
(Continued)

(52) U.S. Cl.
CPC .......... *B22D 17/2023* (2013.01); *B22F 5/106* (2013.01); *B22F 7/02* (2013.01);
(Continued)

(58) Field of Classification Search
CPC .................................................. B22D 17/2023
See application file for complete search history.

(56) References Cited

U.S. PATENT DOCUMENTS

| 4,926,926 A | 5/1990 | Zecman |
| 2006/0213634 A1 | 9/2006 | Kaba et al. |

(Continued)

FOREIGN PATENT DOCUMENTS

| CN | 1758971 A | 4/2006 |
| CN | 1978095 A | 6/2007 |

(Continued)

OTHER PUBLICATIONS

English machine translation of JP-H04-224067 (Year: 1992).*
(Continued)

*Primary Examiner* — Kevin P Kerns
*Assistant Examiner* — Steven S Ha
(74) *Attorney, Agent, or Firm* — Dickinson Wright PLLC (57) ABSTRACT

An insert for a steel shot sleeve of a high-pressure die casting assembly used to form aluminum vehicle components is provided. The insert is formed by additive manufacturing, for example laser sintering, and is located opposite a pouring hole of the shot sleeve. The insert includes multiple layers formed of metals and ceramic designed to reduce damage to the shot sleeve caused while casting the components. For example, a cylindrical body of the shot sleeve can be formed of steel, and the insert can include a base layer formed of the steel. The insert can include middle layers formed of a mixture of the steel; an alloy of chromium, iron, and molybdenum; and zirconium oxide. The insert can also include an inner layer formed of the zirconium oxide. The amount of ceramic increases and the amount of metal decreases in the direction moving toward the inner layer.

17 Claims, 8 Drawing Sheets

(51) Int. Cl.
*B22F 7/02* (2006.01)
*B22F 10/22* (2021.01)
*B22F 10/28* (2021.01)
*B33Y 10/00* (2015.01)
*B33Y 80/00* (2015.01)
*B22F 10/50* (2021.01)

(52) U.S. Cl.
CPC .............. *B22F 10/22* (2021.01); *B22F 10/28* (2021.01); *B33Y 10/00* (2014.12); *B33Y 80/00* (2014.12); *B22F 10/50* (2021.01); *B22F 2998/10* (2013.01)

(56) References Cited

U.S. PATENT DOCUMENTS

| | | | |
|---|---|---|---|
| 2007/0144627 A1 | 6/2007 | Masuda et al. | |
| 2011/0011900 A1* | 1/2011 | Fischer | B22D 17/2023 222/596 |
| 2015/0165521 A1 | 6/2015 | Chow et al. | |
| 2016/0089715 A1 | 3/2016 | O'Keeffe et al. | |
| 2016/0279702 A1 | 9/2016 | Lim et al. | |
| 2016/0311015 A1* | 10/2016 | Kwang | B22D 17/2023 |
| 2017/0113269 A1 | 4/2017 | Robbins | |

FOREIGN PATENT DOCUMENTS

| | | | |
|---|---|---|---|
| CN | 101077644 A | 11/2007 | |
| CN | 103196006 A | 7/2013 | |
| CN | 104942262 A | 9/2015 | |
| CN | 107098700 A | 8/2017 | |
| EP | 2962785 A2 * | 1/2016 | ......... B22D 17/2023 |
| JP | H04224067 A | 8/1992 | |
| JP | 2004216413 A | 8/2004 | |
| JP | 2015083319 A | 4/2015 | |
| TW | 201729922 A | 9/2017 | |
| WO | 2015/076749 A1 | 5/2015 | |

OTHER PUBLICATIONS

Rao et al. "Densification behavior of SLS processed Al2O3/Al Composite," Texas Scholar Works. https://repositories.lib.utexas.edu/handle/2152/69884 (Year: 1995).*

Melvin et al. "The Application of An Artificial Body Force to The Selective Laser Sintering Process," Texas Scholar Works. https://repositories.lib.utexas.edu/handle/2152/64386 (Year: 1992).*

Second Chinese Office Action with English translation dated May 7, 2022 for Chinese Application No. 201980031264.4, 40 pages.

L. Li et al., "Selective Laser Sintering of Compacted Cu/Sn Powders," Section E-ICALEO, 1998, 10 pages.

Extended European Search Report dated Dec. 15, 2021 for European Application No. 19799072.4, 11 pages.

First Chinese Office Action with English translation dated Sep. 9, 2021 for Chinese Application No. 201980031264.4, 36 pages.

* cited by examiner

METHOD FOR IMPROVING HIGH-PRESSURE DIE CASTING SHOT SLEEVE BY ADDITIVE MANUFACTURING METAL MATRIX COMPOSITE INSERT

CROSS-REFERENCE TO RELATED APPLICATIONS

This U.S. National Stage Patent application claims the benefit of PCT International Patent Application Serial No. PCT/US2019/031667 filed May 10, 2019 entitled "Method For Improving High-Pressure Die Casting Shot Sleeve By Additive Manufacturing Metal Matrix Composite Insert" which claims the benefit of U.S. Provisional Patent Application Ser. No. 62/670,064 filed on May 11, 2018, and titled "Method For Improving High Pressure Die Casting Shot Sleeve By Additive Manufacturing Metal Matrix Composite Insert", the entire disclosures of which are hereby incorporated by reference.

BACKGROUND OF THE INVENTION

1. Field of the Invention

The invention relates generally to an insert for a shot sleeve of a high-pressure die casting apparatus, a shot sleeve including the insert, methods for manufacturing the insert and the shot sleeve, and methods of manufacturing a vehicle component using the shot sleeve including the insert.

2. Related Art

Metal components, for example components formed of aluminum and designed for use in vehicles, are oftentimes formed by a high-pressure die casting process. This process typically includes pouring molten metal into a shot sleeve, and then forcing the molten metal into a die assembly under high velocities and pressures to form the molten metal into a desired shape.

A problem that can occur with high-pressure die casting is damage or failure of the shot sleeve receiving the molten metal to be formed. There are several possible failure modes. One of the failure modes is referred to as wash out, which is a progressive loss of material of the shot sleeve because of damage and/or and erosion. Another failure mode is soldering, which includes adhesion and build-up of the molten material on the surface of the steel shot sleeve. Other failure modes include deformation (temperature gradients between the bottom and top of the shot sleeve causing uneven thermal expansion), cross cracking (thermal shock or severe jamming of the tip of a plunger in the shot sleeve), thermal fatigue cracking (cracking of the shot sleeve surface caused by repeated thermal cycling, i.e., stress/strain), and heat loss (rapid heat extraction causing premature solidification).

One method used in attempt to prevent damage to the shot sleeve includes applying a molybdenum coating to the shot sleeve. However, molybdenum (Mo) coatings contain large molybdenum molecules, and the bonding strength of molybdenum to steel is not high. The molybdenum coating may wear off quickly due to a thermal expansion (a) of approximately $4.8 \times 10^{-6}$/K which is low compared to the thermal expansion of steel.

Another method used in attempt to reduce shot sleeve damage includes applying a (TiAl)N PVD coating to the shot sleeve. However, the thickness of the (TiAl)N PVD coating is limited to about 10 microns (0.01 mm). Coatings this thin also tend to wear off quickly. Another coating includes a cobalt-based alloy, such as Stellite® 6, but this type of material typically wears off the shot sleeve quickly when exposed to molten aluminum due to the solubility of cobalt in molten aluminum. Accordingly, improvements to techniques for preventing shot sleeve damage in high-pressure die casting systems are needed.

SUMMARY

One aspect of the invention provides an insert for a shot sleeve of a high-pressure die casting apparatus. The insert includes multiple layers of different materials designed to reduce damage and erosion to the shot sleeve.

Another aspect of the invention provides a shot sleeve for a high-pressure die casting apparatus. The shot sleeve comprises an insert located opposite a pouring hole for receiving molten metal during a casting process. The insert includes multiple layers of different materials designed to reduce damage and erosion to the shot sleeve.

Yet another aspect of the invention provides a method of manufacturing an insert for a shot sleeve of a high-pressure die casting apparatus using an additive manufacturing process.

Another aspect of the invention provides a method of manufacturing a shot sleeve including an insert, wherein the insert includes multiple layers of different materials formed by an additive manufacturing process.

Yet another aspect of the invention provides a method of manufacturing a vehicle component using a shot sleeve which includes an insert.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF EXAMPLE EMBODIMENTS

One aspect of the invention provides a shot sleeve 10 including a body formed of steel and including a metal matrix composite insert 12 coupled to the body and capable of reducing damage to the shot sleeve 10 when the shot sleeve 10 is used during a high-pressure die casting process to form vehicle components of aluminum or aluminum alloys. The insert 12 includes layers 14 of different metal and ceramic materials formed by an additive manufacturing process. The insert 12 has low solubility in aluminum and thus can prevent wash out. The insert 12 is also wear resistant and provides high hardness and strength, including fatigue strength. The thermal expansion and conductivity of the insert 12 is similar to the steel of the body of the shot sleeve 10. The ceramic of the insert 12 is also able to reduce soldering. The insert 12 also maintains a strong bond to the steel body of the shot sleeve 10 during operation.

Figure 1A:
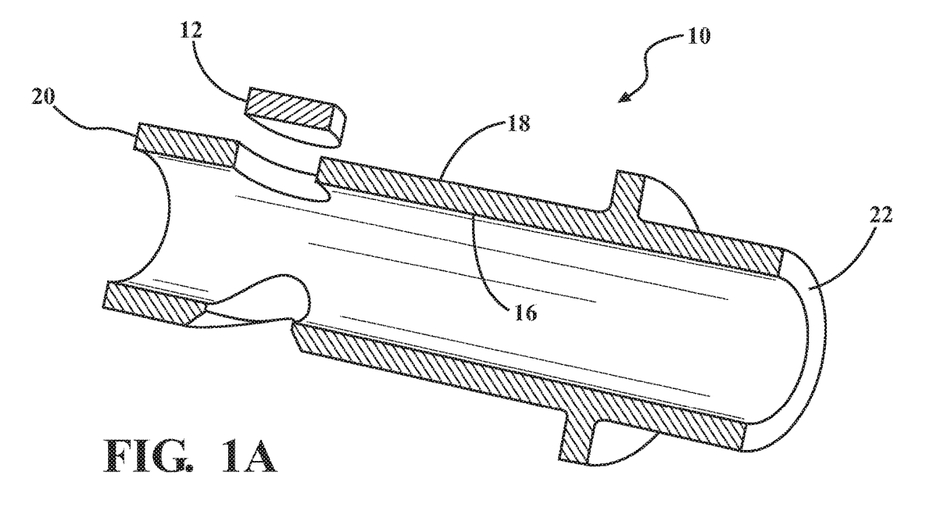
FIG. 1A is cross-sectional view of a shot sleeve for a high-pressure die casting apparatus, wherein the shot sleeve includes an insert according to an example embodiment.
Figure 1B:
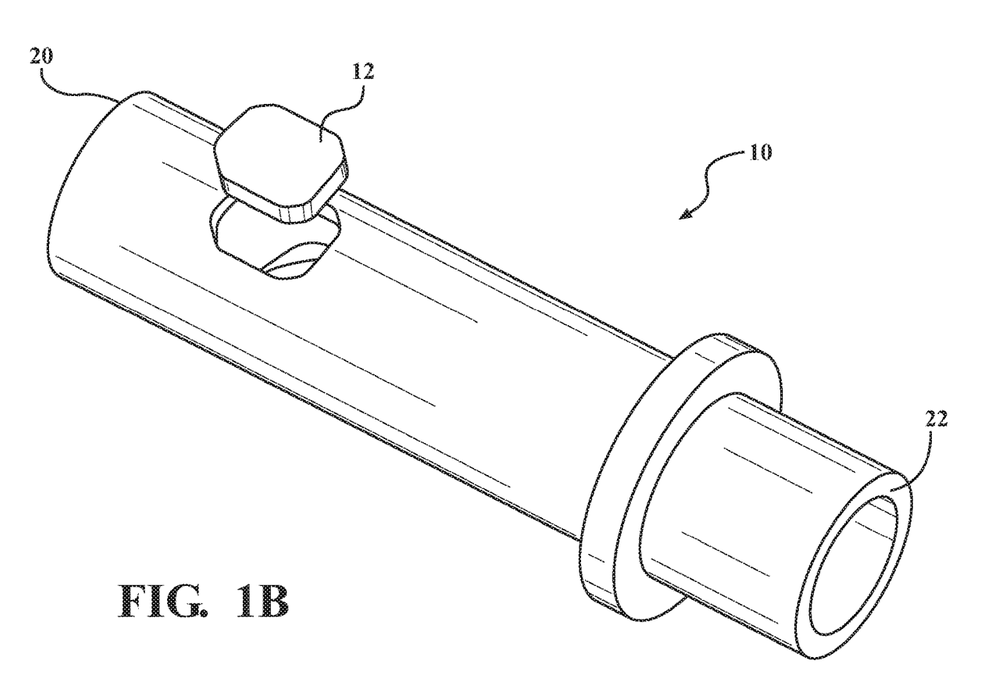
FIG. 1B is a perspective view of the shot sleeve of FIG. 1A.
Figure 2A:
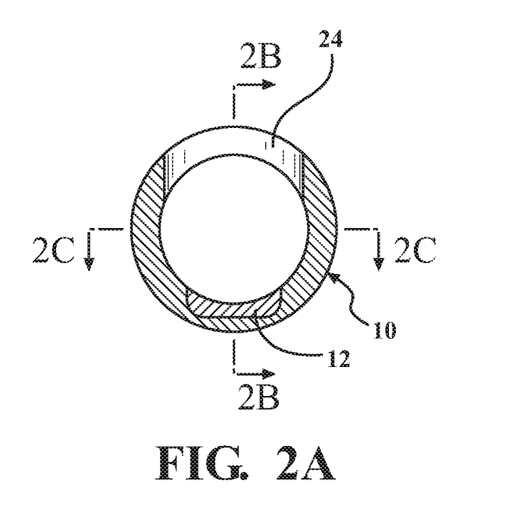
FIG. 2A is a cross-sectional end view of a shot sleeve including an insert opposite a pouring hole according to an example embodiment.
Figure 2B:
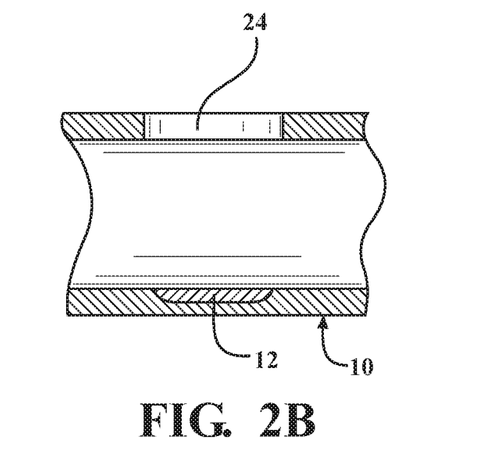
FIG. 2B is a cross-sectional side view of the shot sleeve of FIG. 2A.
Figure 2C:
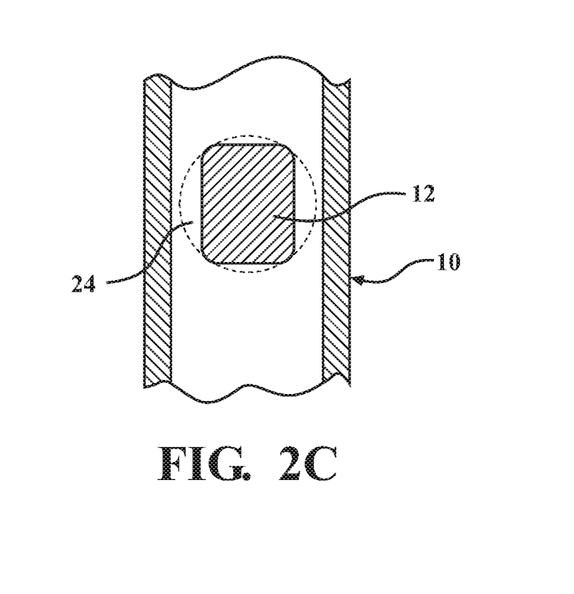
FIG. 2C is a cross-sectional top view of the shot sleeve of FIG. 2A.
Figure 8:
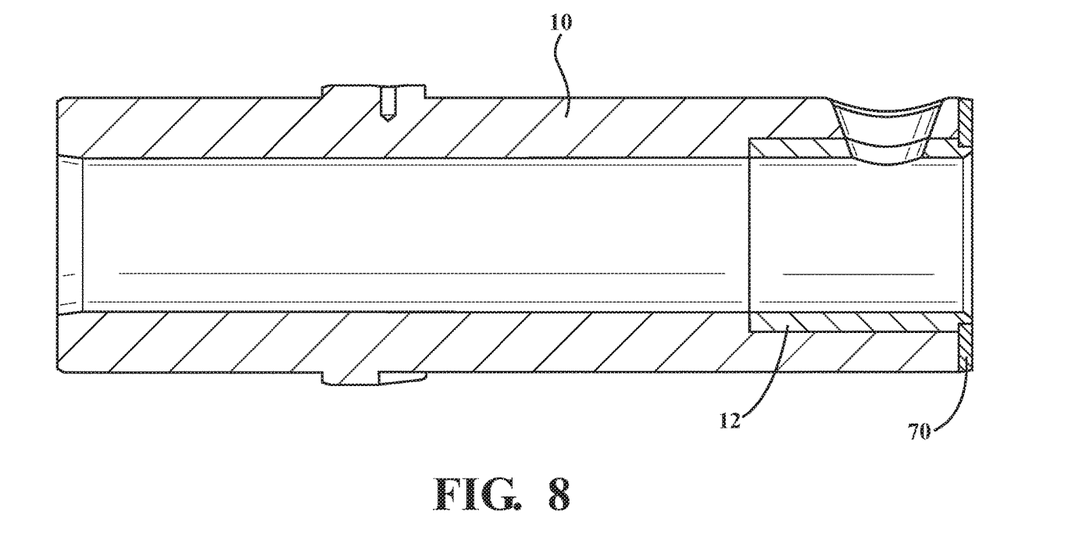
FIG. 8 is an example of a shot sleeve for a larger die assembly which includes an insert disposed in a groove or notch formed inside the shot sleeve according to an example embodiment.

Examples of the shot sleeve 10 are shown in FIGS. 1A-2C, but the shot sleeve 10 can have other dimensions and designs. In the example embodiments, the shot sleeve 10 includes the body having a body inner surface 16 and a body outer surface 18. The body extends longitudinally from a first end 20 to a second end 22 and circumferentially around a center axis. The body of the shot sleeve 10 includes a pouring hole 24 along one side for receiving molten metal, for example aluminum, during the die casting process. In the example embodiments, the pouring hole 24 is closer to the first end 20 than the second end 22 of the shot sleeve 10 which is near a die parting surface. The insert 12 is located directly opposite the pouring hole 24 of the shot sleeve 10, and the insert 12 is typically welded to the body of the shot sleeve 10. The insert 12 includes an insert inner surface 25 adjacent and surrounded by the body inner surface 16. In the embodiment of FIGS. 1A-1C, an insert outer surface 27 is located adjacent and is surrounded by the body outer surface 18. The insert outer surface 27 could also be welded to the body inner surface 16, as shown in FIGS. 2A-2C. Alternatively, the shot sleeve 10 is formed of an inner and outer component, and the insert 12 is part of the inner component that is inserted into the larger shot sleeve outer component, as shown in FIG. 8. In this case, the insert 12 has a thickness of 19 mm and the entire shot sleeve 10 has a thickness of 66.5 mm. In this embodiment, the insert outer surface 27 is disposed on the body inner surface 18. Also in this embodiment, a ring 70 is located at an end of the shot sleeve 10 to hold the insert 12 in place.

The body of the shot sleeve 12 is typically formed of steel, for example a type of steel referred to as H13, which is alloyed with chromium and molybdenum. The H13 steel is also referred to as chromium hot-worked steel. The H13 steel is the baseline material of the shot sleeve 10 due to its excellent combination of toughness and fatigue strength. The dimensions and shape of the insert 12 can vary depending on the size of the body of the shot sleeve 10 and pouring hole 24. In the embodiment of FIGS. 1A-1C, the insert 12 has a thickness of about 19 mm, and the length of the insert 12 is slightly longer than the width. In the embodiment of FIG. 2A-2C, the insert 12 has a length of 3.25 inches, a width of 2.5 inches, and a thickness of 0.75 inches. At least some layers of the insert 12 can have curved sidewalls with a radius R of 0.50, as shown in FIG. 2A. The dimensions of the insert 12 are slightly less than the dimensions of the pouring hole 24, which has a diameter of 3.75 inches. The thickness of the shot sleeve 10 of this example embodiment is 0.75 inches.

Figure 3:
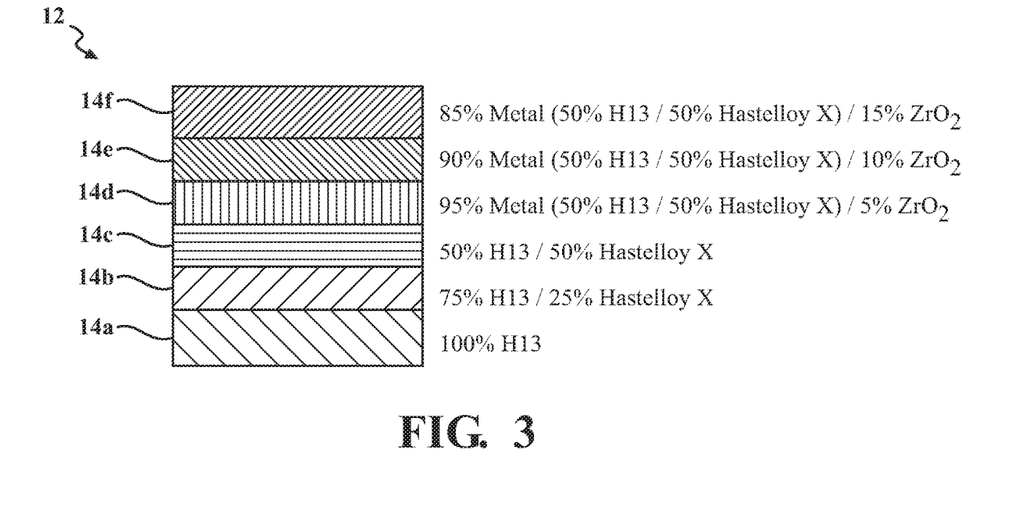
FIG. 3 illustrates multiple layers of metal, metal and ceramic, or metal which form an insert according to an example embodiment.
Figure 4:
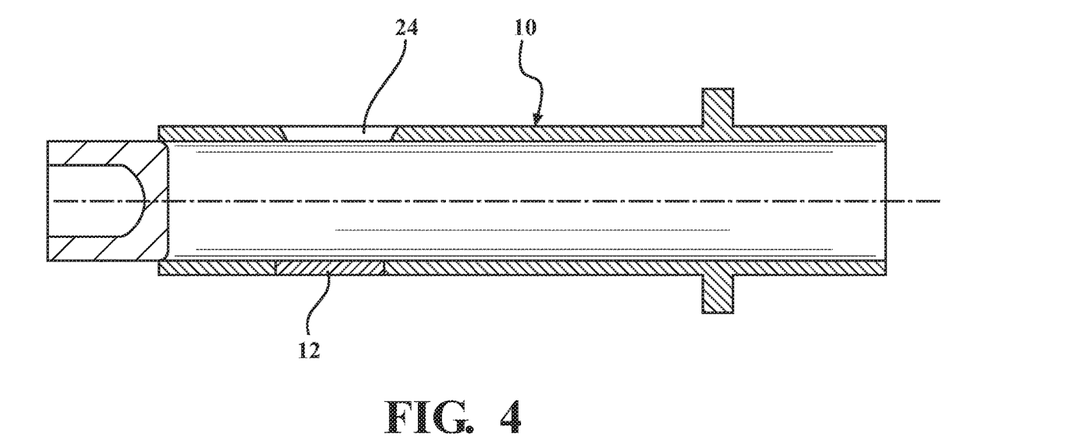
FIG. 4 is a side cross-sectional view of a shot sleeve including an insert and a plunger according to another example embodiment.

The insert 12 is formed by the additive manufacturing process and includes multiple layers 14 of the metal and ceramic materials. The insert 12 includes a base layer 14a which is located on the body outer surface 18 of the shot sleeve 10, an inner layer 14f located along the body inner surface 16 of the shot sleeve 10, and at least one middle layer, but typically a plurality of middle layers 14b-14e. An example of the insert 12 including the multiple inner layers is shown in FIG. 3. According to one embodiment, the thermal expansion and conductivity of the insert 12 can be similar to the steel of the body of the shot sleeve. According to another embodiment, the thermal expansion and conductivity of the insert 12 can be tailored to minimize the amount of clearance variation between the shot sleeve 10 and a plunger tip.

The base layer 14a of the insert 12 is typically formed completely of metal, for example the same metal used to form the body of the shot sleeve 10. In the example of FIG. 3, the base layer 14a of the insert 12 and the body portion of the shot sleeve 10 are formed of the H13 steel, which provides an excellent combination of high toughness and fatigue resistance. The material used to form the base layer 14a is typically present in the middle layers 14b-14e, but the amount of that material decreases in a direction moving toward the inner layer 14f. The at least one middle layer 14b-14e typically includes a combination of different metals and/or a combination of metal and ceramic. The middle layers 14b-14e closest to the base layer 14a typically include a combination of different metals, for example a combination of H13 steel and Hastelloy X. However, other types of metals could be used. Hastelloy X is an alloy including nickel, chromium, iron, and molybdenum, and it is recommended for use in high temperature applications because it has unusual resistance to oxidizing and high strength. The amount of Hastelloy X typically increases in a direction moving toward the inner layer as the amount of the H13 steel decreases. The middle layers 14b-14e closest to the inner layer 14f typically include a combination of metal and ceramic. For example, those middle layers 14b-14e can include a combination of H13, Hastelloy X, and ceramic. An example of the ceramic is zirconium oxide ($ZrO_2$), which has excellent thermal insulation and high resistance to crack propagation. However, other types of ceramic could be used. If the insert 12 includes multiple layers containing ceramic, the amount of ceramic typically increases and the amount of metal typically decreases in the direction moving toward the inner layer 14f.

In the example embodiment of FIG. 3, the insert 12 combines different layers of H13 steel, Hastelloy X, and $ZrO_2$. More specifically, the insert 12 includes the base layer 14a, four of the middle layers 14b-14e, and the inner layer 14f. The base layer 14a is formed of 100% H13 steel. The first middle layer 14b, located closest to the base layer 14a is formed of 75% H13 steel and 25% Hastelloy X, based on the total weight of the first middle layer 14b. The second middle layer 14c is formed of 50% H13 steel and 50% Hastelloy X, based on the total weight of the second middle layer 14c. The third middle layer 14d is formed of 95% metal and 5% $ZrO_2$, based on the total weight of the third middle layer 14d. The fourth middle layer 14e is formed of 90% metal and 10% $ZrO_2$, based on the total weight of the fourth middle layer 14e. The inner layer 14f is formed of 85% metal and 15% $ZrO_2$, based on the total weight of the inner layer 14f. The metal of the third, fourth, and fifth middle layers 14c-14d include 50% H13 steel and 50% Hastelloy X, based on the total weight of the metal portion of the layer. The H13, Hastelloy X, and $ZrO_2$ all have a thermal expansion (a) of approximately $4.8 \times 10^{-6}$/K. The metal matrix can be woven in between the ceramic to allow the insert to have a thermal conductivity similar to H13 steel.

The insert 12 of the shot sleeve 10 provides numerous advantages, including low solubility in aluminum, which can prevent wash out. The insert 12 is also wear resistant and provides high hardness and strength, as well as good fatigue strength. The thermal expansion and conductivity of the insert 12 is similar to the steel of the shot sleeve 10, for example H13. The ceramic of the insert 12 is also able to reduce soldering. The insert 12 is able to reduce shot sleeve failure, specifically damage under the pouring hole 24 caused by the molten metal poured into the shot sleeve 10 during the high-pressure die casting process.

Another aspect of the invention provides a method of manufacturing the shot sleeve 10 with the insert 10. As indicated above, the layers 14 of the insert 12 are formed by an additive manufacturing process, and then the finished insert 12 is welded or otherwise joined to the body of the steel shot sleeve 10. The insert 12 can be in the form of a plug welded into an opening of the shot sleeve opposite the pouring hole 24, as shown in FIGS. 1A-1C, or the insert 12 can be welded to the body inner surface 16 of the shot sleeve 10 in a location opposite the pouring hole 24, as shown in FIGS. 2A-2C.

Figure 5:
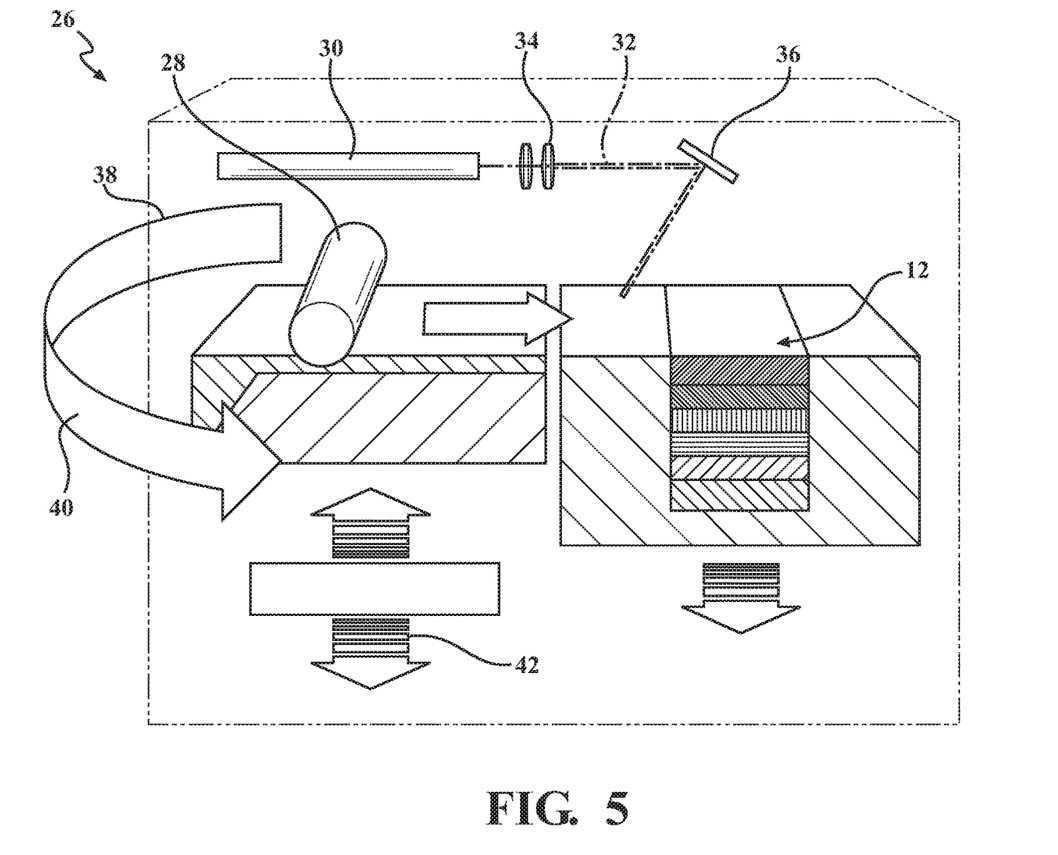
FIGS. 5 and 6 illustrate a system and equipment used to form an insert according to an example embodiment.
Figure 6:
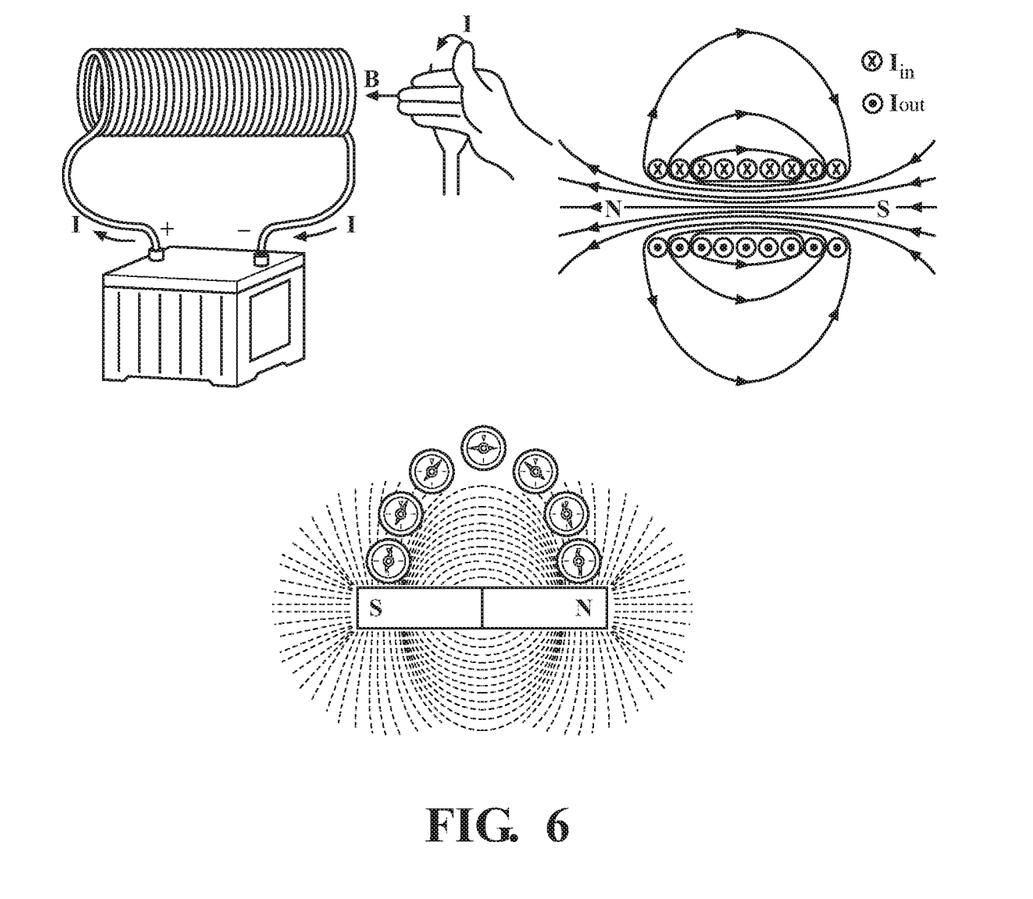

Another aspect of the invention provides a system 26 capable of performing the additive manufacturing process and forming the insert 12. Example systems 26 used to form the insert 12 are shown in FIGS. 5 and 6, but other systems can be used to form the insert 12 and shot sleeve 10 with the insert 12. In the example system of FIGS. 5 and 6, the different layers 14 of the insert 12 are built from powder or particles of the metal and ceramic using a laser sintering process with an ultrasonic vibration and rotating magnetic field to align the metal powder along with the ceramic particles to create a robust structure. As shown in FIG. 5, the example system 26 includes a metal and ceramic powder supply 28 which is used to create the layers 14. The system 26 also includes a laser 30 emitting a laser beam 32, lenses 34, X-Y scanning mirror 36, recoater arm 38, rotating magnetic field 40, and ultrasonic vibration 42. The laser beam 32 fuses the particles of the metal to build the base layer 14a, the particles of metal and ceramic mixture to form that at least one middle layer 14b-14e, and particles of ceramic to form the inner layer 14f. The system preferably includes a creative re-coater arm to lay down the metal and ceramic powders in certain ratio per layer from a ceramic and metal powder supply tray.

The laser sintering process itself should focus more on the ceramic in multiple spots/stages simultaneously in order to achieve good properties with minimal residual stress in the insert 12. It may not be possible to control the alignment of the ceramic particulates. However, it is possible to control the powder metal around the ceramic using the magnetic field and the ultrasonic vibration, which allows for generally improved powder movement and packing density. The method can include applying an ultrasonic vibration and magnetic field to the particles of metal and ceramic. FIG. 6 shows a solenoid 44 used in the system of an example embodiment to apply the magnetic field to the particles of metal and ceramic.

Figure 7:
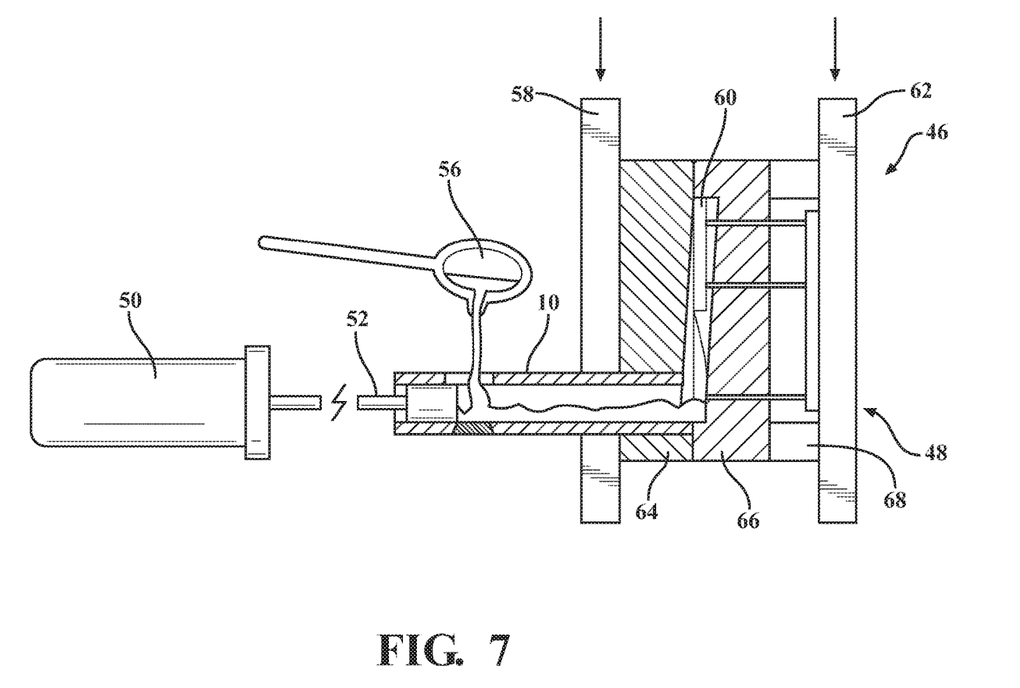
FIG. 7 illustrates a high-pressure die casting apparatus including a shot sleeve with an insert according to an example embodiment.

Another aspect of the invention provides a high-pressure die casting apparatus 46 including the shot sleeve 10 with the insert 12, and a method of manufacturing a component using the high-pressure die casting apparatus 46. An example of the apparatus 46 is shown in FIG. 7, but other types of casting apparatuses can be used with the shot 10 sleeve and insert 12 described above. The apparatus includes a die assembly 48, hydraulic cylinder 50, plunger 52, the shot sleeve 10, and ladle 56 for pouring the molten metal into the shot sleeve 10. Normally the clearance between the tip of the plunger 52 and the shot sleeve 10 is between 0.002 inches and 0.005 inches (0.051 mm and 0.127 mm). Any clearance smaller than 0.002 inches could result in seizing of the plunger tip. Any clearance larger than 0.005 inches could result in flashing, and then the plunger tip could seize on the flash.

The insert 12 of FIG. 7 is located opposite the pouring hole 24 of the shot sleeve 10. The shot sleeve 10 is coupled to the die assembly 48, and the hydraulic cylinder 50 pushes the molten metal, for example aluminum or aluminum alloy, through the shot sleeve 12 and into the die assembly 48. The die assembly 48 includes a stationary platen 58, die cavity 60, ejector platen 62, cover die 64, ejector die 66, and ejector box 68. The method of manufacturing the component includes forming molten material into the die cavity 60 and forming the molten material to the desired shape in the die cavity 60, for example the shape of a component for an automotive vehicle.

The size of the shot sleeve 10 depends on the size of the die assembly 48. There are different size shot sleeves 10 for different size high-pressure die casting machines or assemblies. For example, for larger die assemblies, the insert 12 can be formed as a separate piece and then fit in groove or notch formed inside the shot sleeve 10, as shown in FIG. 8. For smaller die assemblies, the insert 12 can be part of the body of the shot sleeve 10 itself, as shown in FIGS. 1A-2C, and 4.

Figure 9:
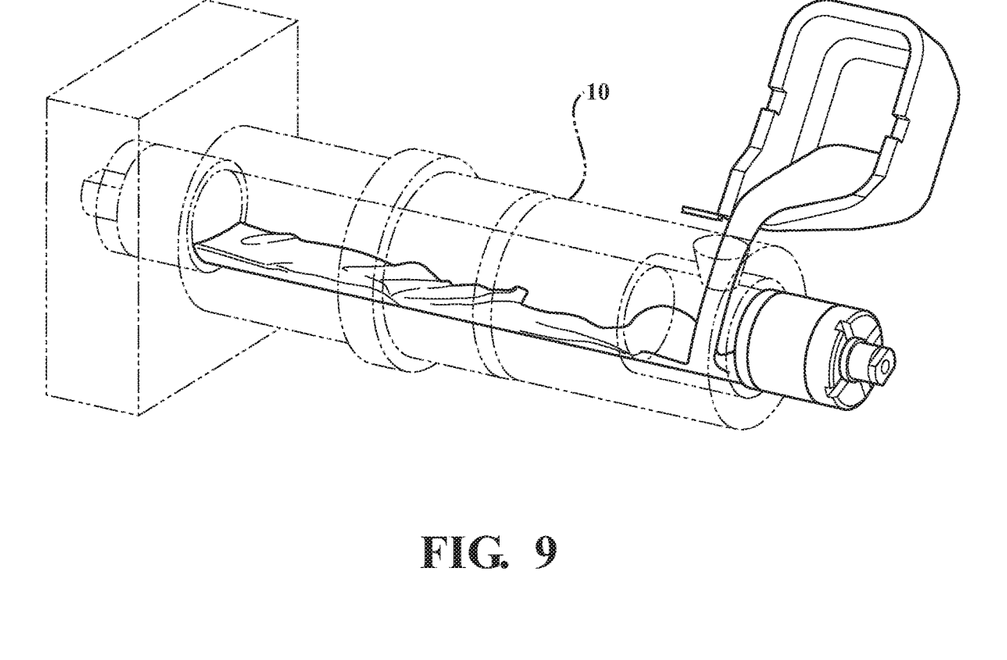
FIGS. 9-11 illustrate temperature variations along a shot sleeve when molten melt is poured into the shot sleeve according to an example embodiment.
Figure 10:
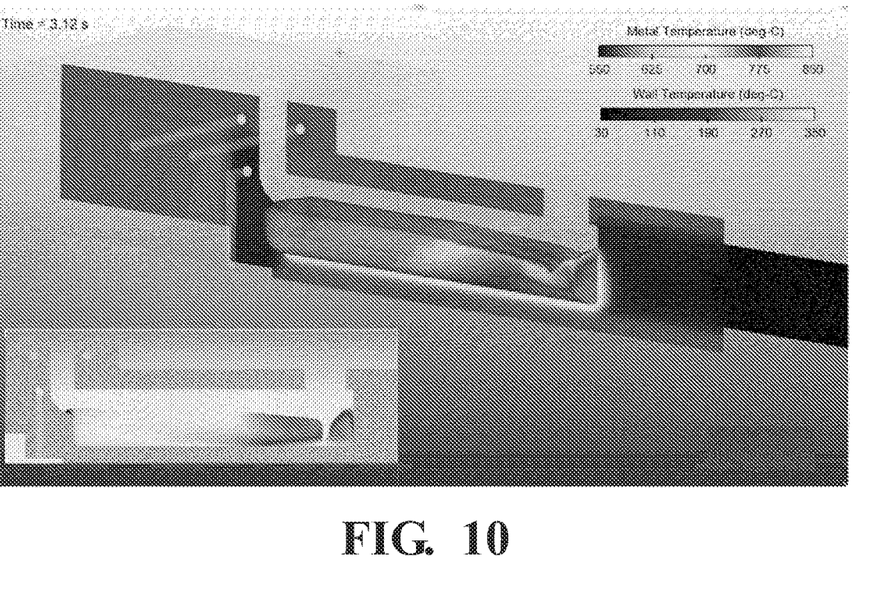
Figure 11:
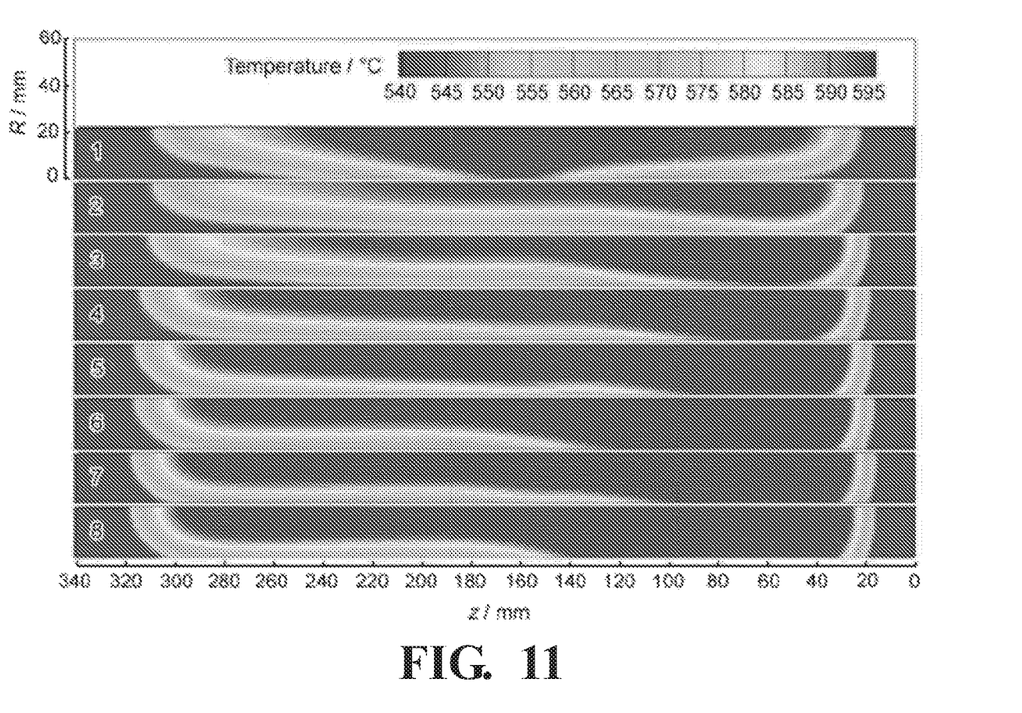

As shown in FIGS. 9 and 10, when the molten metal is poured into the shot sleeve 10 via the pouring hole 24, the area directly under the pouring hole 24 is generally hotter than the area further away (toward the die parting surface). There is also a temperature variation between the plunger tip and the shot sleeve 10, and a temperature variation along the shot sleeve 10 itself. When the shot sleeve 10 is at different temperatures in different places, it changes shape as well as size of the shot sleeve 10. As shown in FIG. 11, some regions of the shot sleeve 10 expand more than other regions because they are at different temperatures.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. An insert for a shot sleeve of a die casting apparatus, the insert comprising:
    a base layer including metal;
    an inner layer including ceramic;
    at least one middle layer between the base layer and the inner layer;
    the at least one middle layer including metal in an amount greater than an amount of metal in the inner layer and less than an amount of the metal in the base layer; and the at least one middle layer including ceramic in an amount less than an amount of the ceramic in the inner layer and greater than an amount of ceramic in the base layer, wherein the metal of the base layer and the metal of the at least one middle layer includes steel; the metal of the at least one middle layer further includes an alloy of chromium, iron, and molybdenum; and the ceramic of the at least one middle layer and the ceramic of the inner layer includes zirconium oxide.

2. The insert of claim 1, wherein the at least one middle layer includes a first middle layer, a second middle layer, a third middle layer, and a fourth middle layer; the first middle layer is located between the inner layer and the second middle layer; the first middle layer includes the steel and the alloy of chromium, iron, and molybdenum; the second middle layer is located between the first middle layer and the third middle layer; the second middle layer includes the alloy of chromium, iron, and molybdenum in an amount greater than an amount of the alloy in the first layer; the third middle layer is located between the second middle layer and the fourth middle layer; the third middle layer includes the steel, the alloy of chromium, iron, and molybdenum, and the zirconium oxide; the fourth middle layer is located between the third middle layer and the inner layer; the fourth middle layer includes the steel, the alloy of chromium, iron, and molybdenum, and the zirconium oxide in an amount greater than an amount of the zirconium oxide in the third middle layer.

3. The insert of claim 1 wherein the layers are curved.

4. A shot sleeve, comprising:
a body extending circumferentially around a center axis and longitudinally from a first end to a second end;
the body presenting a body inner surface and a body outer surface;
the body including a pouring hole;
an insert located opposite the pouring hole;
the insert comprising a base layer, an inner layer, and at least one middle layer between the base layer and the inner layer;
the inner layer presenting an insert inner surface adjacent the body inner surface;
the base layer including metal;
the inner layer including ceramic;
the at least one middle layer including metal in an amount greater than an amount of metal in the inner layer and less than an amount of the metal in the base layer; and
the at least one middle layer including ceramic in an amount less than an amount of the ceramic in the inner layer and greater than an amount of ceramic in the base layer;
wherein the metal of the base layer and the metal of the at least one middle layer includes steel;
the metal of the at least one middle layer further includes an alloy of chromium, iron, and molybdenum; and
the ceramic of the at least one middle layer and the ceramic of the inner layer includes zirconium oxide.

5. The shot sleeve of claim 4, wherein the insert is welded to an opening of the body of the shot sleeve located opposite the pouring hole; and the base layer presents a base outer surface adjacent and surrounded by the body outer surface.

6. The shot sleeve of claim 4, wherein the insert is disposed on the body inner surface; and a ring is located at the first end of the shot sleeve adjacent the insert to hold the insert in position.

7. The shot sleeve of claim 4, wherein the at least one middle layer includes a first middle layer, a second middle layer, a third middle layer, and a fourth middle layer; the first middle layer is located between the inner layer and the second middle layer; the first middle layer includes the steel and the alloy of chromium, iron, and molybdenum; the second middle layer is located between the first middle layer and the third middle layer; the second middle layer includes the alloy of chromium, iron, and molybdenum in an amount greater than an amount of the first layer; the third middle layer is located between the second middle layer and the fourth middle layer; the third middle layer includes the steel, the alloy of chromium, iron, and molybdenum, and the zirconium oxide; the fourth middle layer is located between the third middle layer and the inner layer; the fourth middle layer includes the steel, the alloy of chromium, iron, and molybdenum, and the zirconium oxide in an amount greater than an amount of the third middle layer.

8. A method of manufacturing an insert for a shot sleeve of a die casting apparatus, comprising the steps of:
forming a base layer including metal;
forming at least one middle layer on the base layer;
forming an inner layer including ceramic on the at least one middle layer, the at least one middle layer including metal in an amount greater than an amount of metal in the inner layer, and the at least one middle layer including ceramic in an amount less than an amount of the ceramic in the inner layer; and
the steps of forming the base layer, the at least one middle layer, and the inner layer including an additive manufacturing process;
wherein the metal of the base layer and the metal of the at least one middle layer includes steel; the metal of the at least one middle layer further includes an alloy of chromium, iron, and molybdenum; and the ceramic of the at least one middle layer and the ceramic of the inner layer includes zirconium oxide.

9. The method of claim 8, wherein the metal and the ceramic of the layers are in the form of particles, and the step of forming the includes applying a laser to the particles.

10. The method of claim 9 further including applying ultrasonic vibration and a magnetic field to the particles.

11. A method of manufacturing a shot sleeve of a die casting apparatus, comprising the steps of:
manufacturing an insert by an additive manufacturing process, the additive manufacturing process including:
forming a base layer including metal;
forming at least one middle layer on the base layer;
forming an inner layer including ceramic on the at least one middle layer, the at least one middle layer including metal in an amount greater than an amount of metal in the inner layer, and the at least one middle layer including ceramic in an amount less than an amount of the ceramic in the inner layer;
wherein the metal of the base layer and the metal of the at least one middle layer includes steel; the metal of the at least one middle layer further includes an alloy of chromium, iron, and molybdenum; and the ceramic of the at least one middle layer and the ceramic of the inner layer includes zirconium oxide;
coupling the insert to a body of a shot sleeve extending circumferentially around a center axis and including a pouring hole; and
wherein the insert is disposed opposite the pouring hole.

12. The method of claim 11, wherein the step of coupling the insert to the body of the shot sleeve includes welding the insert to an opening in the body of the shot sleeve located opposite the pouring hole.

13. A method of manufacturing a component for a vehicle, the method comprising the steps of:
pouring molten aluminum or aluminum alloy into a shot sleeve coupled to a cavity of a die casting apparatus, the shot sleeve including: a body extending circumferentially around a center axis and longitudinally from a first end to a second end; the body presenting a body inner surface and a body outer surface; the body including a pouring hole; an insert located opposite the pouring hole; the insert comprising a base layer, an inner layer, and at least one middle layer between the base layer and the inner layer; the inner layer presenting an insert inner surface adjacent the body inner surface; the base layer including metal; the inner layer including ceramic; the at least one middle layer including metal in an amount greater than an amount of metal in the inner layer; and the at least one middle layer including ceramic in an amount less than an amount of the ceramic in the inner layer;
wherein the metal of the base layer and the metal of the at least one middle layer includes steel; the metal of the at least one middle layer further includes an alloy of chromium, iron, and molybdenum; and the ceramic of the at least one middle layer and the ceramic of the inner layer includes zirconium oxide; and
forming the molten aluminum or aluminum alloy in the cavity of the die casting apparatus.

14. The method of claim 13, wherein the layers of the insert are curved.

15. The method of claim 13, wherein the insert is welded to an opening of the body of the shot sleeve located opposite the pouring hole; and the base layer presents a base outer surface adjacent and surrounded by the body outer surface.

16. The method of claim 13, wherein the insert is disposed on the body inner surface; and a ring is located at the first end of the shot sleeve adjacent the insert to hold the insert in position.

17. The method of claim 13, wherein the at least one middle layer includes a first middle layer, a second middle layer, a third middle layer, and a fourth middle layer; the first middle layer is located between the inner layer and the second middle layer; the first middle layer includes the steel and the alloy of chromium, iron, and molybdenum; the second middle layer is located between the first middle layer and the third middle layer; the second middle layer includes the alloy of chromium, iron, and molybdenum in an amount greater than an amount of the first layer; the third middle layer is located between the second middle layer and the fourth middle layer; the third middle layer includes the steel, the alloy of chromium, iron, and molybdenum, and the zirconium oxide; the fourth middle layer is located between the third middle layer and the inner layer; the fourth middle layer includes the steel, the alloy of chromium, iron, and molybdenum, and the zirconium oxide in an amount greater than an amount of the third middle layer.

* * * * *